United States Patent
Brugger et al.

(10) Patent No.: US 7,583,416 B2
(45) Date of Patent: Sep. 1, 2009

(54) DOCUMENT SCANNING SYSTEM WITH TETHERED PLATEN ELEMENT PROVIDING SHEET-FED AND PLATEN SCANNING FUNCTIONS

(75) Inventors: Charles E. Brugger, Rochester, NY (US); Joseph T. Olesik, Honeyoe Falls, NY (US); George O. Simmons, North Greece, NY (US); Nelson A. Blish, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1329 days.

(21) Appl. No.: 10/028,133

(22) Filed: Dec. 20, 2001

(65) Prior Publication Data

US 2003/0117670 A1 Jun. 26, 2003

(51) Int. Cl.
*H04N 1/04* (2006.01)
(52) U.S. Cl. ............ 358/474; 358/498; 358/1.15; 358/514; 271/10.01; 250/208.1; 399/367
(58) Field of Classification Search ............ 358/474, 358/505, 1.15, 520, 1.18, 1.19, 498, 487, 358/482, 483, 513–514, 496; 382/119; 715/515; 707/1; 705/1; 356/1.6; 250/208.1; 271/10.01, 271/10.3, 10.02, 225; 399/367
See application file for complete search history.

(56) References Cited

U.S. PATENT DOCUMENTS

| | | | | |
|---|---|---|---|---|
| 4,485,409 A | * | 11/1984 | Schumacher | 358/479 |
| 4,734,760 A | * | 3/1988 | Futaki | 358/514 |
| 5,424,844 A | * | 6/1995 | Koyanagi et al. | 358/296 |
| 5,532,841 A | * | 7/1996 | Nakajima et al. | 358/408 |
| 5,929,435 A | * | 7/1999 | Han | 250/234 |
| 6,122,684 A | * | 9/2000 | Sakura | 710/73 |
| 6,330,082 B1 | * | 12/2001 | Oliver | 358/473 |
| 6,363,491 B1 | * | 3/2002 | Endo | 713/310 |
| 6,587,233 B1 | * | 7/2003 | Salgado | 358/505 |
| 6,628,433 B1 | * | 9/2003 | Westcott et al. | 358/474 |
| 6,869,316 B2 | * | 3/2005 | Hinkle et al. | 439/675 |
| 7,130,091 B2 | * | 10/2006 | Ishimaru et al. | 358/496 |
| 7,272,723 B1 | * | 9/2007 | Abbott et al. | 713/185 |
| 7,317,560 B2 | * | 1/2008 | Nishinohara et al. | 358/487 |
| 7,446,909 B2 | * | 11/2008 | Hashizume | 358/474 |
| 2001/0027997 A1 | * | 10/2001 | Cocuzza et al. | 235/454 |
| 2002/0008758 A1 | * | 1/2002 | Broemmelsiek et al. | 348/143 |
| 2002/0049919 A1 | * | 4/2002 | Jansen | 713/300 |
| 2007/0127053 A1 | * | 6/2007 | Tominaga | 358/1.14 |
| 2007/0268528 A1 | * | 11/2007 | Ikeno et al. | 358/474 |

* cited by examiner

*Primary Examiner*—Edward L Coles
*Assistant Examiner*—Negussie Worku
(74) *Attorney, Agent, or Firm*—Nelson A. Blish (57) ABSTRACT

A modular scanning system (10) consisting of a first scanning unit (11) and a plurality of tethered scanning (13) and digital capture elements (150, 160) providing both sheet-fed, platen, and digitally captured documents and photographs. The first scanning unit (11) includes all the mechanisms necessary to permit sheet-fed scanning of documents. The platen scanner (13) provides a second scanning unit which performs platen scanning of documents on a glass top (26) of the platen scanner (13). Since the platen scanner (13) is detachable, the user has the option to select the platen scanning functionality but with the additional flexibility of selectively mounting or storing the platen element.

16 Claims, 11 Drawing Sheets

DOCUMENT SCANNING SYSTEM WITH TETHERED PLATEN ELEMENT PROVIDING SHEET-FED AND PLATEN SCANNING FUNCTIONS

CROSS REFERENCE TO RELATED APPLICATIONS

Reference is made to commonly-assigned copending U.S. patent application Ser. No. 09/618,739, filed Jul. 18, 2000, entitled DOCUMENT SCANNING SYSTEM WITH DOCKABLE PLATEN FLATBED PROVIDING SHEET-FED AND PLATEN SCANNING FUNCTIONS, by Westcott et al., the disclosure of which is incorporated herein.

FIELD OF THE INVENTION

This invention is related to document or picture scanners having a flatbed or platen scanning element as well as a sheet-fed element. It is most particularly related to applications in which it is convenient for the images formed by the flatbed portion to be processed and transmitted by the sheet-fed portion in the same manner in which the sheet-fed images are and where it would be convenient for the flatbed portion to be separate from the sheet-fed portion and detached and stored when not needed.

BACKGROUND OF THE INVENTION

Figure 1:
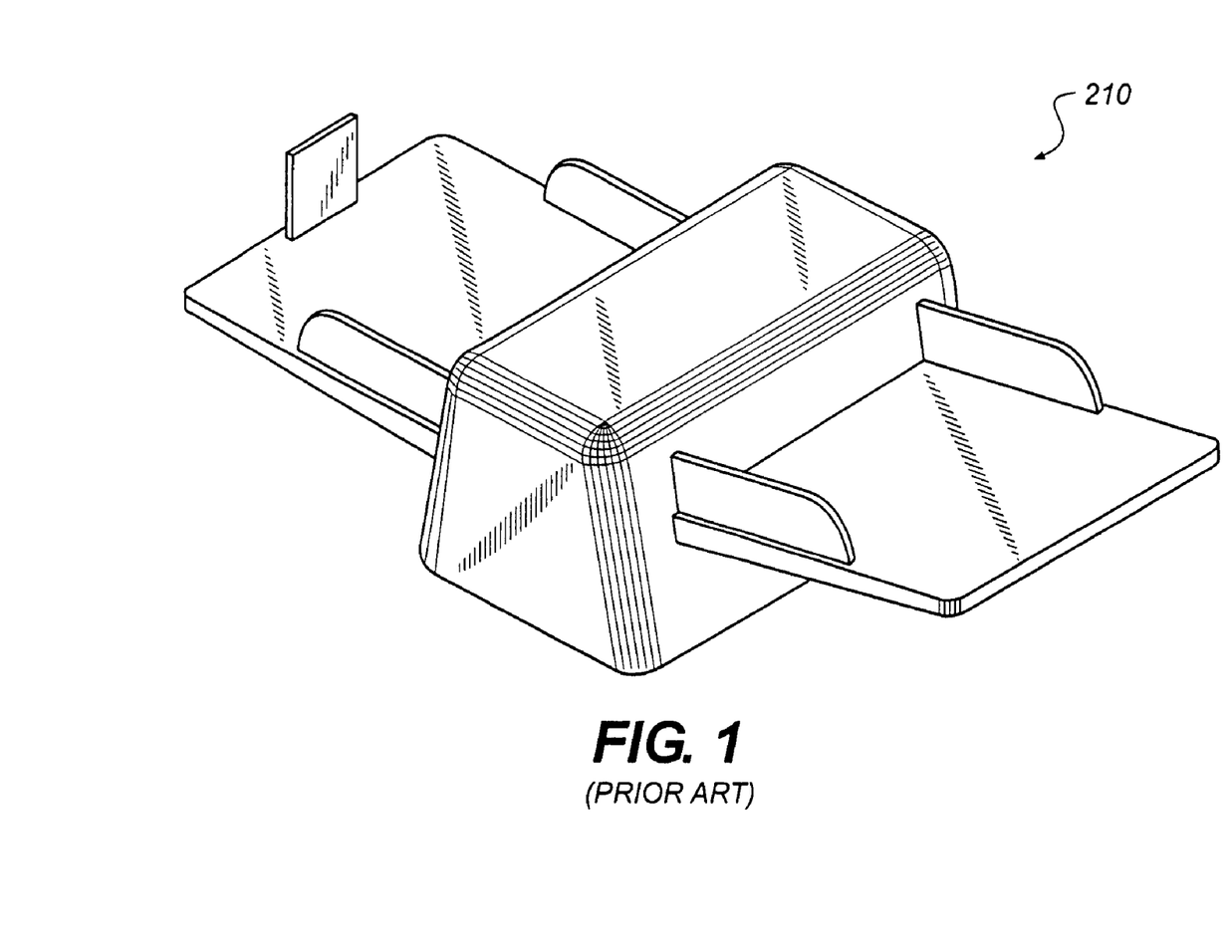
FIGS. 1-3 are a perspective views of a prior art sheet-fed, platen, and combination scanners.

Document scanners have become a popular computing accessory both in the home and the office. Essentially, document scanners (or simply "scanners") come in three distinct varieties: sheet-fed scanners 210 as shown in FIG. 1, platen scanners 220 shown in FIG. 2, and scanners 230 having a rigid combination of sheet-fed and platen scanning capabilities shown in FIG. 3. With respect to sheet-fed scanners 210, an image-forming subsystem, such as a camera, typically a linear imaging sensor and a lens in combination with an illumination source, scans an image by moving a sheet of paper past the camera, which sits in a stationary position. The documents are fed from a stack and are passed through a paper path disposed at the field of view of the camera. As each document passes in front of the camera individual raster lines are imaged by the camera and then pieced together to create a 2D image representation of the original document. The camera captures the width of the image, line by line, while the document is moved past the camera.

Figure 2:
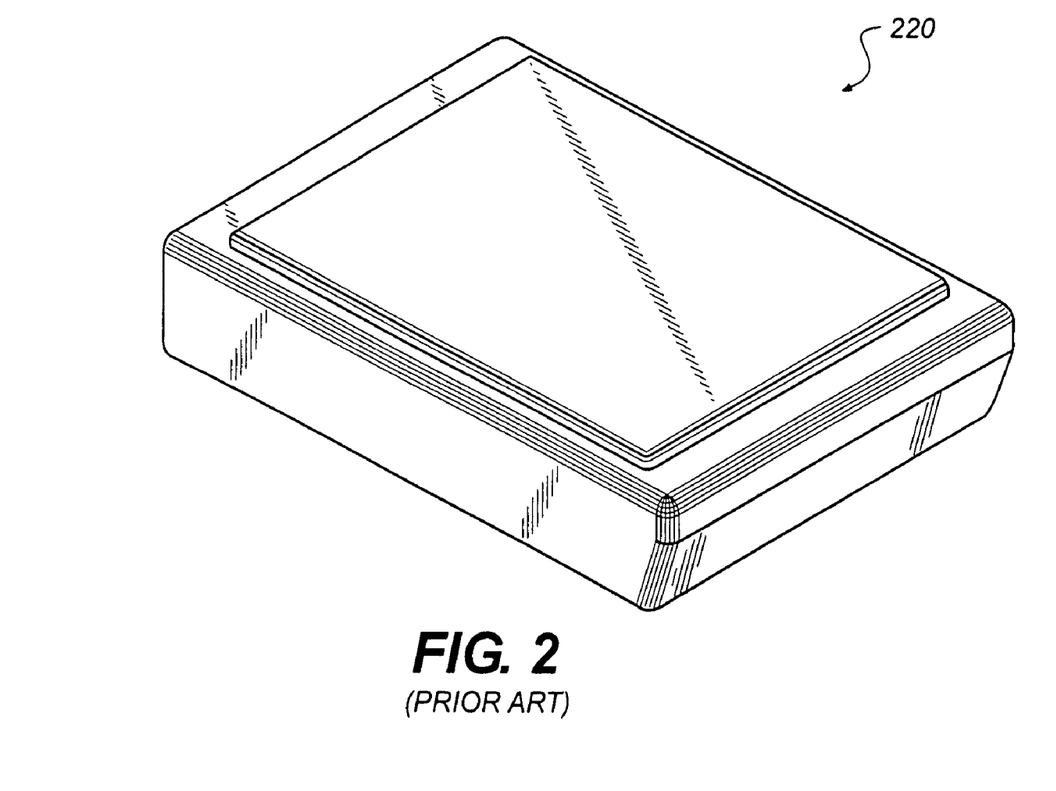

With respect to platen scanners 220, a document is placed face down onto a stationary flat transparent surface of the scanning unit and the image-forming subsystem, camera and illumination source, moves underneath the fixed document to perform the scanning operation. In this case, the camera is moved the length of the document while the camera's optics covers the width of the scanned document. The platen scanner requires lifting a lid and placing document sheets face down one at a time. The platen capability is also employed to deal with documents that do not feed from a stack reliably.

Figure 3:
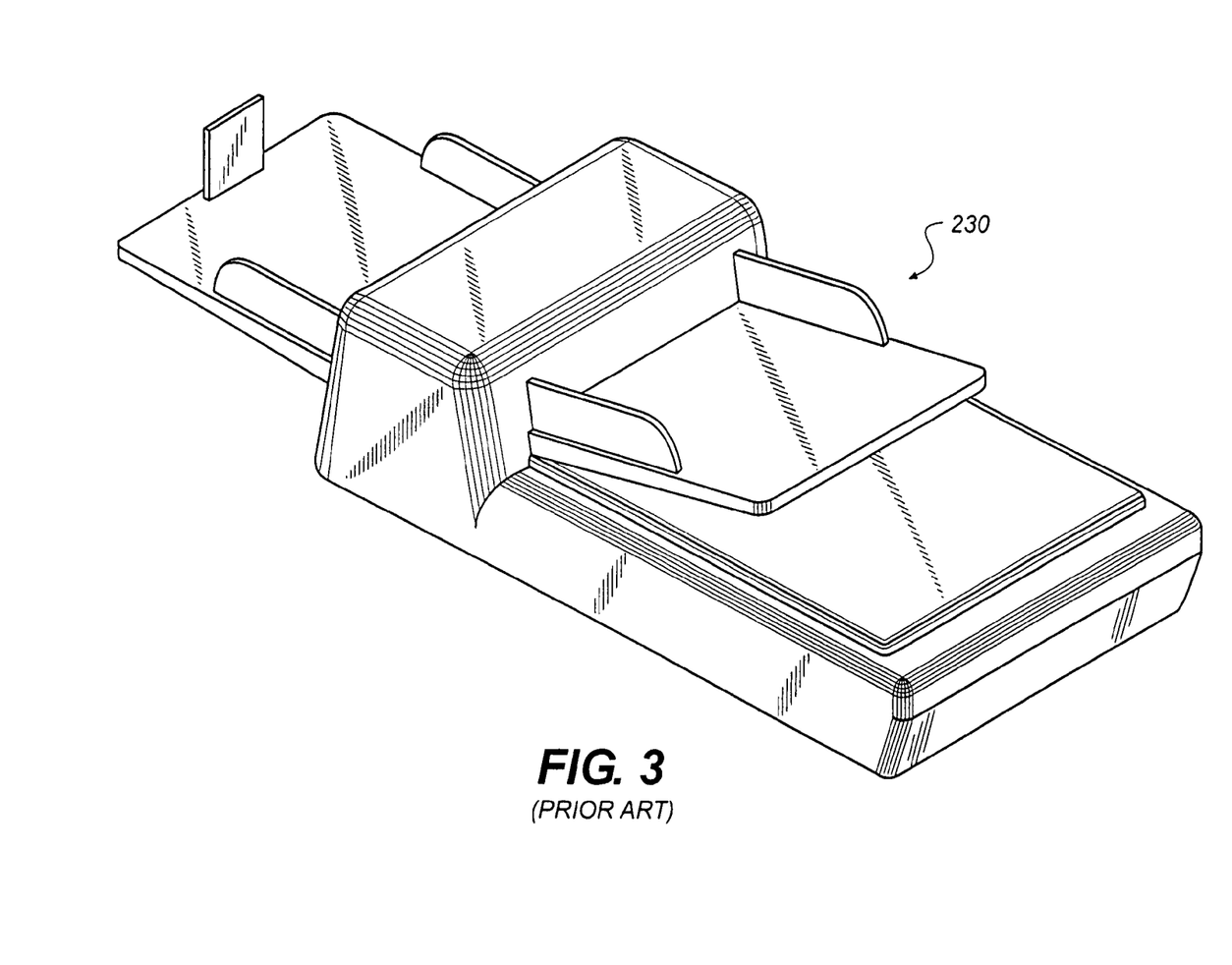

Scanners vary in speed, function, and cost and are often used by businesses for scanning large quantities of documents. The demand for scanning at a given installation can be as high as from several hundred (100) to several hundred thousand (100,000) pages per day. Sheet-fed scanners offer greatest productivity by employing an imaging system on both sides of the paper path, imaging both the front and back of each document during the same scanning operation. One type of production scanner 230 attempts to combine the functionality of a sheet-fed scanner with that of a platen scanner. Essentially, such combination production scanners are manufactured as a single unit that combine the platen scanning functions with the sheet moving functions in a single box.

With prior sheet-fed, platen, or combination scanners, the user must select one type in favor of another. For those customers whose primary need is for a sheet-fed scanner but who occasionally need the platen utility, they must purchase a combination device or two separate scanners (one sheet-fed and one platen). Purchasing both types of scanning devices may be cost prohibitive or impossible and, in either case, impractical for applications where portability is desired. For example, a scanning service provider may require the ability to carry the scanner and host computer in order to transport both systems to a remote jobsite. After the job is finished, the scanner and computer must be brought back to the service bureau headquarters or to the next jobsite. One task may require scanning a large number of similar documents, suited to the sheet-fed scanner and not requiring a platen. The next task at the next site may require scanning fragile documents or books, requiring the use of a platen. Thus, portability and the ability to reconfigure and perform multiple scanning functions are critical to people who buy scanners to scan documents as a service.

Other limitations of the prior art combination production scanners that combine platen and sheet feeding functions in one unit are the relatively high cost and large size of the combined form. Since the form is larger, the cost of manufacture is increased over the single function scanning device. Typically, such combination production scanners only come in one of various classes suitable for scanning a single size or style of document. For example, the platen portion of one combination scanner can be equipped to handle 8½×11 inch and the European equivalent A4 sized documents. The platen portion of a different model is equipped to handle 11 by 17 inch and the European equivalent A3 sized documents. Thus, a given prior art combination production scanners may not be configured to scan the size of documents that the customer desires to scan.

As such, a relatively low cost scanning device that can be had to handle various paper sizes in a unit having a minimum sized footprint, and which combines the functionality of a platen scanner with that of a sheet-fed scanner, and which offers significant flexibility in situating the platen portion relative to the sheet-fed portion, would provide numerous advantages.

SUMMARY OF THE INVENTION

According to one aspect of the present invention a scanning system supporting platen and sheet-fed scanning of documents comprises a first scanning unit with a first enclosure housing a first set of mechanisms for enabling full sheet-fed scanning functions. The first scanning unit also comprises a tether interface. A second scanning unit with a second enclosure is attached to the first scanning unit through the tether interface and includes a second set of mechanisms for enabling complete platen scanning of documents in operable combination with the first scanning unit.

The present invention provides a modular scanner with a separate platen element for either single sheet and/or book scanning which is electronically tethered to and relies upon a scanning unit which provides sheet-fed scanning. This arrangement allows the customer to have sheet-fed function alone to reduce entry-level cost and space requirements and to also add platen-scanning functionality at any time while allowing them to selectively connect or store the platen device. Having a flexible connectivity between the platen element and the sheet-fed element allows greater flexibility in physically situating each element than it would to have them combined into one unit or to mechanically mate them. The space associated with the platen can then be saved on the desktop when not needed. In addition, different sizes of platen element can be offered to accommodate the needs of different customers to scan various sizes of documents.

Accordingly, disclosed in one embodiment is a scanning subsystem supporting platen and sheet-fed scanning of documents. The scanning system comprises a first scanning unit with a first enclosure housing a first set of mechanisms for enabling full sheet-fed scanning functions. The first scanning unit also includes the connection necessary to interface with the platen scanning unit. The second scanning unit with a second enclosure is tethered to the first scanning unit through the connection interface. The second scanning unit includes a set of mechanisms for enabling complete platen scanning of documents in operable combination with the control and image processing functions within the first scanning unit. The tether utilizes either a combination communications/power cable (containing separate data and power conductors) or an infrared link, RF link, or another equivalent technology. The platen device relies upon the sheet-fed element for interface to the host for processing instructions and transferring the scanned images, eliminating the need to duplicate these functions in the platen scanning element.

This tethered configuration also allows attaching more than one platen element to the sheet-fed unit at one time for greater productivity, allowing documents to be exchanged on one platen while a document is being scanned on another.

In one embodiment, the first scanning unit includes a feeder opening through which paper documents can be fed for sheet-fed scanning. An exit opening is provided and adapted to deliver scanned documents to an output tray. A paper pathway extends from the feeder opening through the scanner to the exit opening. A first image-forming subsystem is disposed within the first scanning unit and configured to scan images appearing on paper documents fed through the feeder opening and transported over the paper pathway. A second image-forming subsystem is also disposed within the first scanning unit and configured to scan images in the same manner as the first image-forming unit, but disposed to view the opposite side of the transported documents. A feed roller disposed about the feeder opening effects the introduction of documents onto the paper pathway. A separation roller or separation pad can also be employed and used to ensure that only a single sheet of paper is fed through the feeder opening at a time.

The first scanning unit further includes a plurality of rollers disposed about the first paper pathway for effecting transmission of paper documents from the feeder opening to the exit opening. The image-forming subsystems can include a lens and a light source disposed about the paper pathway for directing light onto paper documents that have entered the first scanning unit through the feeder opening. Mirrors within each image-forming subsystem are configured for guiding reflected light from the paper document through the lens and onto the imaging sensor. In this way, the image-forming subsystems are able to scan a document being transported through the first scanning unit.

Further disclosed is a separate platen element for a modular scanning system. The platen element includes an enclosure having a top surface with a glass top attached thereon. A translation means is provided within the enclosure and attached to the image-forming subsystem and causing it to move in a direction permitting scanning of documents placed on the glass top. The platen element can include a lid with a substantially flat surface suitable for covering documents placed on the glass top. The lid can be opened and closed with a hinging means that couples the lid to the enclosure. The translation means can include a pulley and belt system adapted to engage the image-forming subsystem for effecting its motion and permitting platen scanning of documents placed on the glass top. A rod or rods within the enclosure can be engaged with the image-forming subsystem and guide its movement for platen scanning.

In yet another embodiment, additional scanning and digital capture devices are tethered to the first scanning unit to perform specialized functionality such as check scanning, ticket scanning, or digital photography. In each instance, the first scanning unit provides the electronic processing of the digitally captured images and the single connection to the host application. The tethered interface provides flexibility and scalability by providing additional scanning capability from a multiple of external capture devices.

BRIEF DESCRIPTION OF THE DRAWINGS

For a better understanding of the invention, reference is made to the following detailed description taken in conjunction with the appended drawings in which.

Corresponding numerals and references in the detailed description correspond to like parts in the figures unless otherwise indicated.

DETAILED DESCRIPTION OF THE INVENTION

Figure 4:
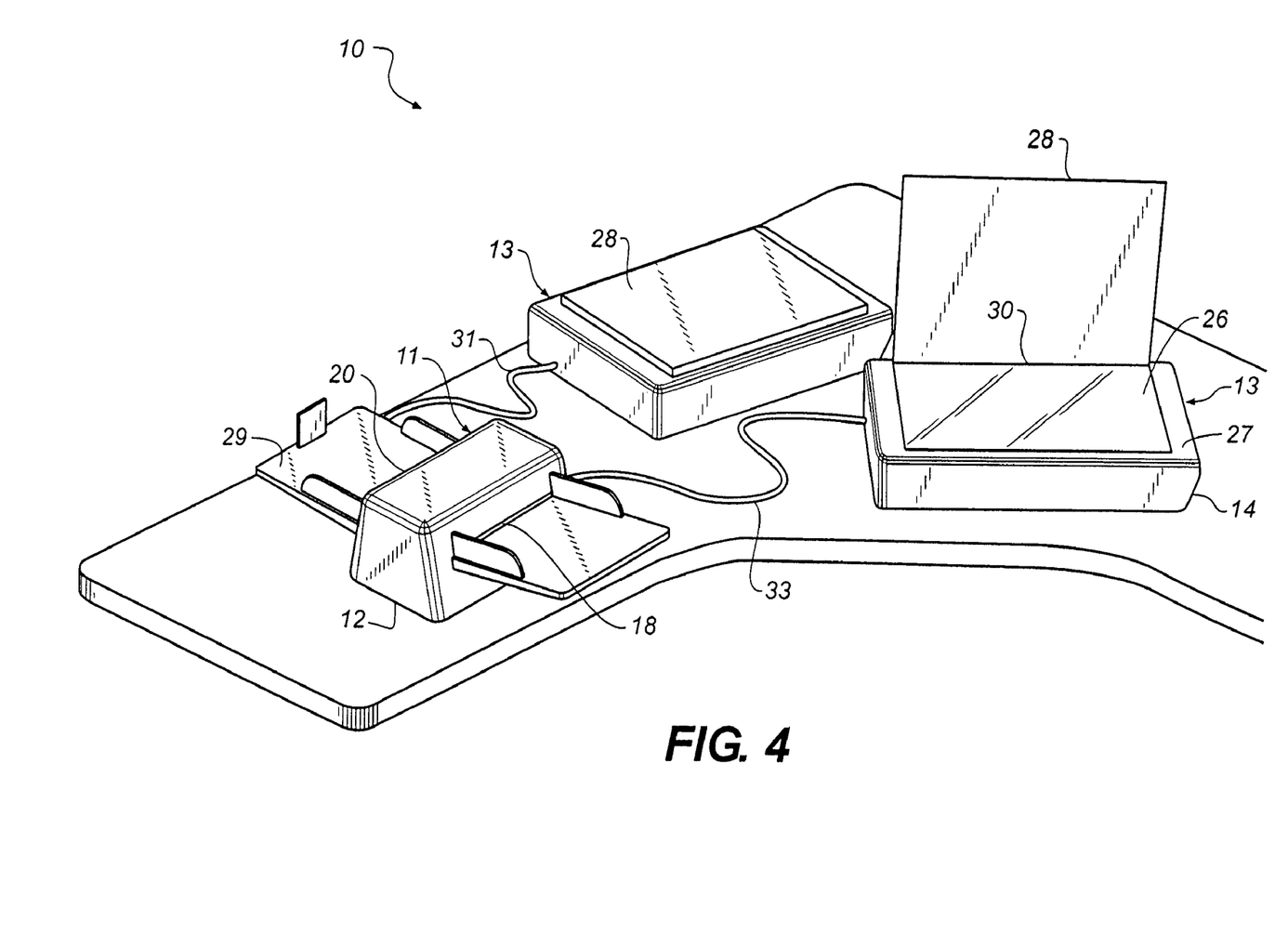
FIGS. 4 and 5 are perspective views of a scanning system according to the present invention with tethered platen elements.
Figure 5:
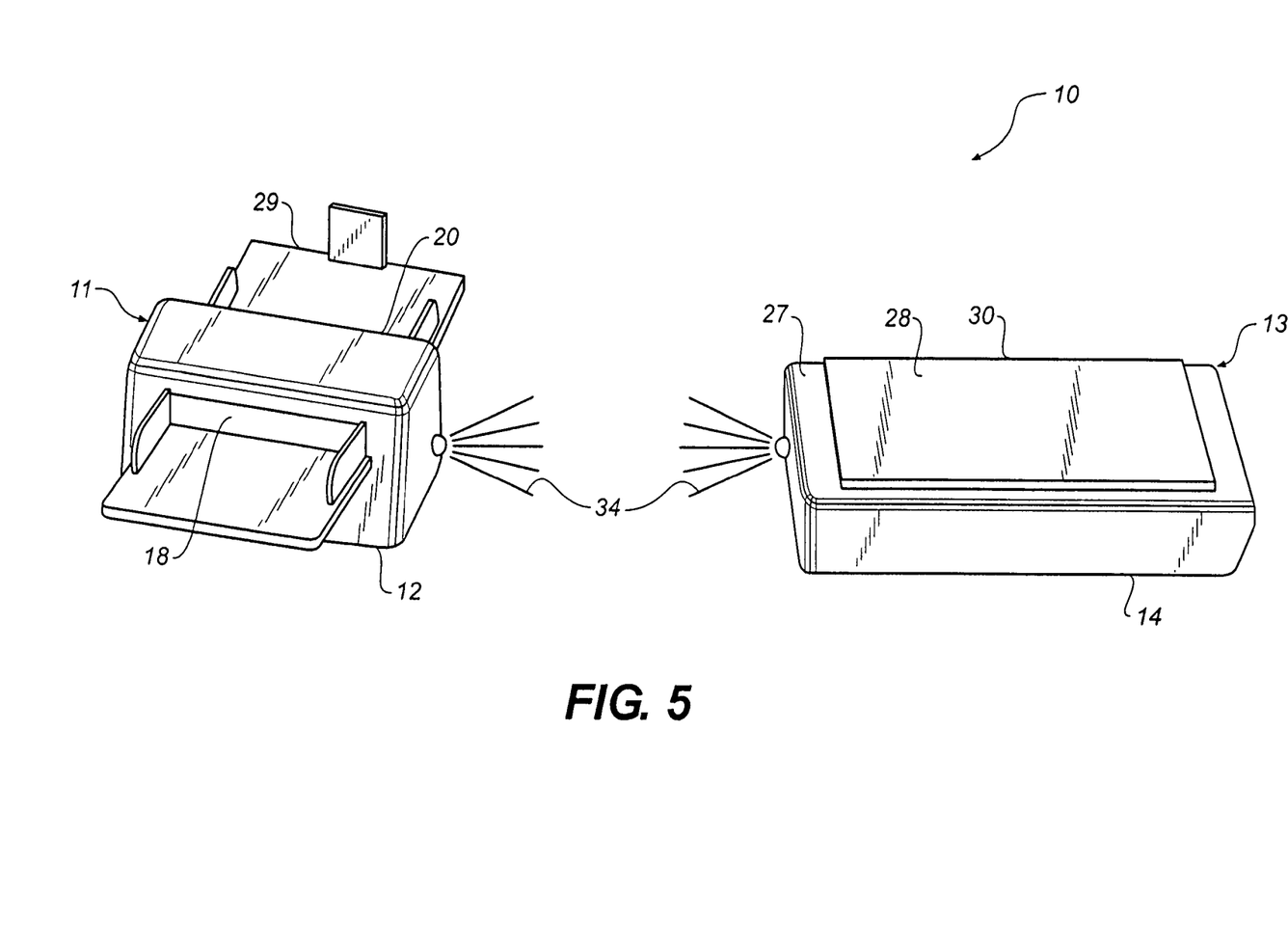

For a better understanding of the invention, reference is made to FIGS. 4 and 5, which illustrate a modular scanning system 10 of the present invention, according to the preferred embodiment. Scanner system 10 includes a first scanning unit, which is a sheet-fed scanner 11. Sheet-fed scanner 11 comprises first enclosure 12, which provides a housing for the various components, devices, subsystems, and other mechanisms necessary to effectuate sheet-fed scanning of documents. A feeder opening 18 provides a means for loading documents into the first enclosure 12. Documents exit sheet-fed scanner 11 through exit opening 20.

Scanning system 10 also includes a second scanning unit which is a platen scanner 13. Platen scanner 13 comprises a second enclosure 14 that can be selectively connected to the first enclosure 12 to enable the platen scanning functionality as described herein. Specifically, since the platen scanner 13 is separate from the first sheet-fed scanner, it allows a separation of the platen scanning function from the sheet-fed scanning function. In this way, the weight, space, and cost associated with prior art combination production scanners that combine sheet-fed and platen scanning in a single box can be saved with each section of the scanning system 10 being separately purchasable and transportable.

The second enclosure 14 houses the mechanisms necessary to effect platen scanning. A glass top 26 is attached to the top surface 27 of the second enclosure 14 and provides a space where documents to be scanned are placed. A lid 28 allows covering of documents to be scanned, to limit the outside influence of lights, which would interfere with proper scanning of a document as well as to hold flat against glass top 26. Lid 28 is attached to the second enclosure 14 by hinge 30.

The connection of the platen element 13 to the sheet-fed scanner 11 by wire cable tether 31 or optical fiber tether 33 is illustrated in FIG. 4. The connection of the platen scanner 13 to the sheet-fed scanner 11 by radio frequency transmission 34. Infrared transmission could also be used as illustrated in FIG. 5.

In the configuration shown in FIGS. 4 and 5, a user has the option of sheet-fed scanning by the insertion of documents through feeder opening 18, or platen scanning of documents by placement of documents over glass top 26 of the platen scanner 13. The flexible couplings between sheet-fed scanner 11 and platen scanner 13 allows a user to configure the overall system to fit the two units in a variety of configurations. Combining many of the processing functions in the sheet-fed scanner also provides for a reduction of components in the platen scanner and provides for a lower cost unit then buying two separate document scanners.

Figure 6:
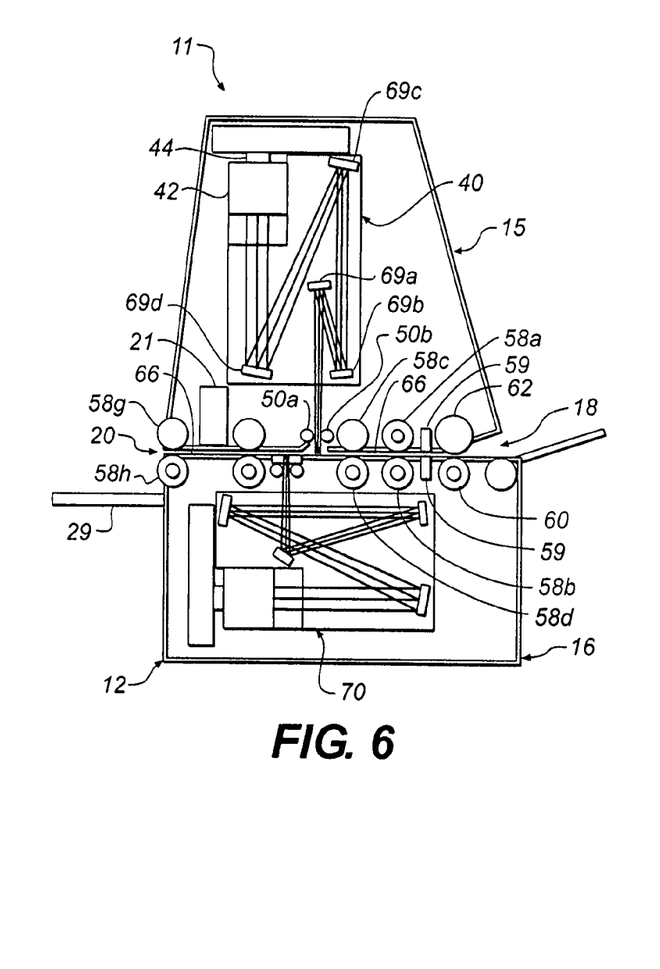
FIGS. 6 and 7 are schematic side views, showing details of the internal mechanisms of the first scanning unit (sheet-fed element) of the scanning system of the present invention.
Figure 7:
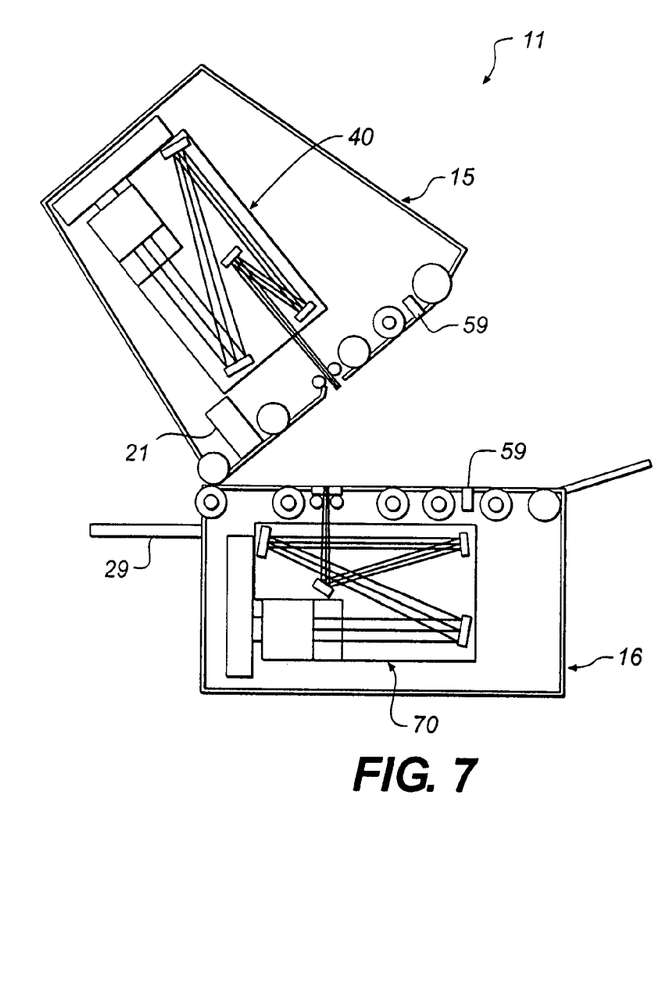

Referring to FIGS. 6 and 7, therein is shown a first scanning unit, denoted generally as 11, illustrating the various components, devices, subsystems, and mechanisms that are included in a modular scanning system such as modular scanning system 10. Specifically, sheet-fed scanner 11 includes the mechanisms necessary to achieve full sheet-fed scanning of documents fed through feeder opening 18. Additionally, sheet-fed scanner 11 includes the controls and connections necessary to facilitate platen scanning in combination with a set of mechanisms within the platen scanner 13.

The sheet-fed scanner 11 is seen to include a pair of rollers 60 and 62 disposed about the feeder opening 18 and configured to facilitate the transmission of documents onto the paper pathway 66. The top roller 60, often referred to as a feeder roller, is configured to draw a sheet of paper into the first paper pathway 66 by grabbing a document from a stack and transmitting it through the space between the feeder roller 60 and the separation roller 62. This action is often referred to in the industry as "feed and separation." The separation roller 62 can also be referred to as a "retardation" or "singulation" roller, as is well known by those of ordinary skill in the art. The separation roller 62 acts to ensure that only a single sheet of paper enters the paper pathway 66 within the first enclosure 12 of the first scanning unit 11 at any one time.

First and second top rollers 58a and 58c, respectively, work with first and second bottom rollers 58b and 58d, respectively, to transport a document to an area (marked by the dashed lines) where a first image-forming subsystem 40 comprising a camera lens 42 and imaging sensor 44 can scan the document. First and second light sources 50a and 50b, respectively, provide the light energy necessary to illuminate images on a document which are directed to the lens 42 of the image-forming subsystem 40 using light guiding means 69a, 69b, 69c and 69d (hereinafter 69A:69D). Light guiding means 69A:69D are typically mirrors or other similar reflective surfaces disposed within the first enclosure 12 of the first scanning unit 11. In this way, the first image-forming subsystem 40 is capable of obtaining a scanned digital representation of images on documents fed through feeder opening 18. Typically, the first image-forming subsystem 40 is a stationary unit within the first enclosure 12 so that sheet-fed scanning of documents is permitted by motion of the document through the paper pathway 66.

Following scanning, other rollers 58g and 58h within the enclosure 12 transmit the document through opening 20. The paper tray 29 accepts documents being fed through the sheet-fed scanner. Paper tray 29 is commonly referred to in the industry as an "output" or "exit" tray. The number of rollers and their placement or configuration can vary according to design. Rollers 60, 62, and 58a:58h in combination with paper pathway 66 provide a document handling means within the sheet-fed scanner 11.

The sheet-fed scanner 11 is seen to also include a second image-forming subsystem 70 which provides a means for scanning the opposite side of the document simultaneously. This second image-forming subsystem 70 contains the same elements as the first image-forming subsystem 40 they may be in a different configuration to according to the physical space constraints.

Figure 8:
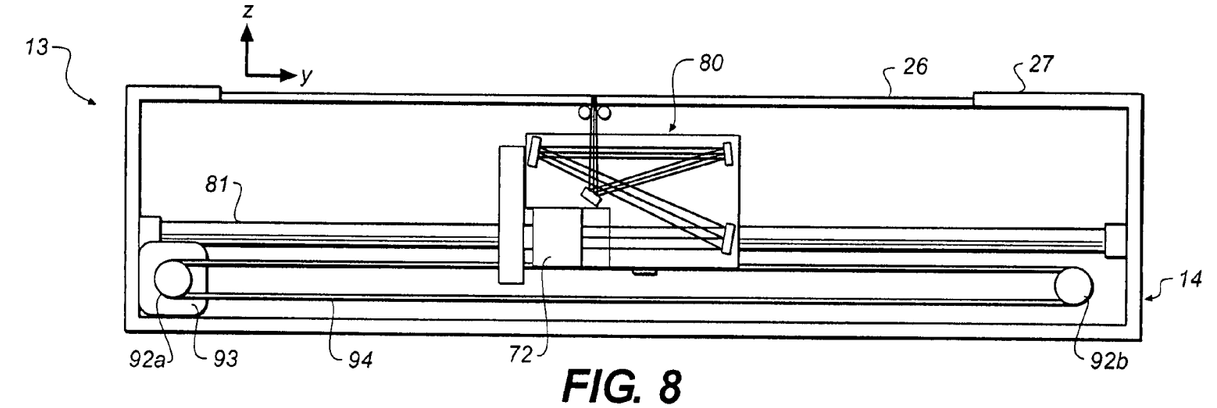
FIGS. 8 and 9 are schematic side views, showing details of the internal mechanisms of the second scanning unit (platen element) of the scanning system, according to one embodiment.
Figure 9:
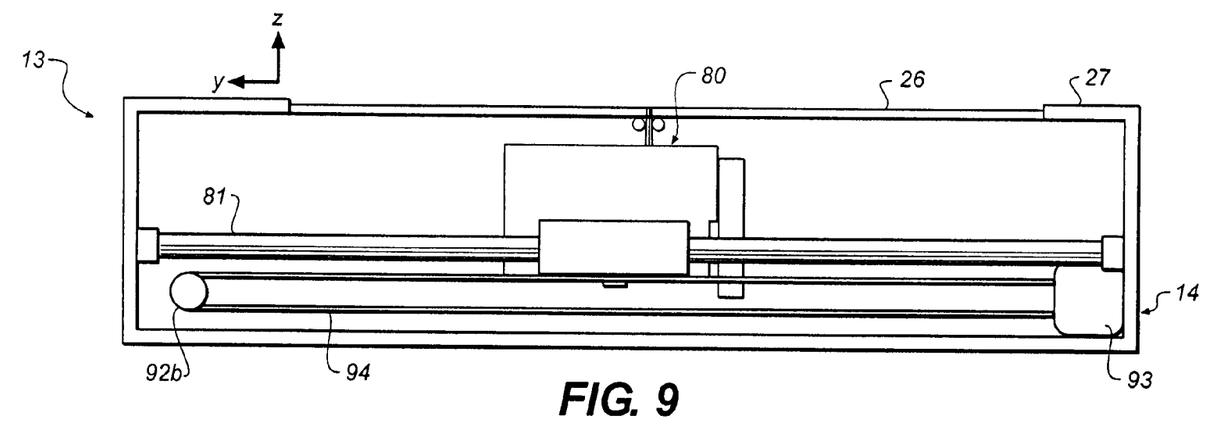

Referring to FIGS. 8 and 9, a platen scanner 13 is shown. A rod bearing 81, or Thompson rod bearing, within the housing of the third image-forming subsystem 80 is provided and adapted for facilitating the motion of the third image-forming subsystem 80 in a direction parallel to axis Y. A drive subsystem, or other suitable translation means, comprises pulleys 92a, 92b, motor 93, and belt 94, can be used for translating the third image-forming subsystem 80. In this way, the third image-forming subsystem 80 glides along rod 81 in the second enclosure 14 of the platen scanner 13 performing platen scanning of documents placed on a glass top 26 of platen scanner 13.

The scanning system 10 of the present invention can include other features and functions found in prior art scanning equipment and well known to those of ordinary skill in the art. For example, FIG. 7 illustrates removal of the upper half 15 of first enclosure 12 of the sheet-fed scanner 11 in order to clear paper and/or other debris that may be stuck within the first paper pathway 66. Upper half 15 of first enclosure 12 is therefore provided with a hinging means (not shown) that allows it to create an opening for clearing paper jams by a user. An inkjet printer 21 can be provided to facilitate printing of identifying characters or codes onto the scanned documents by a user. A double document sensor 59 is used to sense the presence of more than a single sheet of paper that may inadvertently enter the feeder opening 18. Other features and options can be provided as is understood by those of ordinary skill in the art.

In FIGS. 8 and 9, the third image-forming subsystem 80 is traversing along an axis substantially parallel to axis Y. Prior to platen scanning, the lid 28 may be closed to provide the proper lighting, background, and paper constraint conditions for the third image-forming subsystem 80 and, in particular, to permit lens 72 to receive adequate light reflections of images appearing on documents placed on glass top 26. A hinge 30, shown in FIG. 5, or other similar hinging means couples the lid 28 to the top surface 27 of the second enclosure 14.

Accordingly, the present invention provides a scanning system consisting of first and second scanning units that provide for both sheet-fed and platen scanning of documents. Specifically, a sheet-fed scanner 11 includes all the mechanisms necessary to permit sheet-fed scanning of documents using one or two fixed, stationary image-forming subsystems 40 and 70. A platen scanner 13 includes a third image-forming subsystem 80 which performs platen scanning of documents placed on the platen scanner 13. The end result is a modular scanning system 10 with sheet-fed scanner and a connectable tethered platen scanner. This arrangement allows the customer to have sheet-fed and platen scanning functionality, but with the additional flexibility of selectively employing or storing the platen scanner 13. In addition, the scanning system 10 of the present invention permits the user to purchase a sheet-fed scanner 11 with or without the platen scanner 13. The scanning system 10 can accommodate different sizes and shapes of documents and components can be purchased separately based on the needs of the user.

The sheet-fed scanner is an independent device and could be used alone. The sheet-fed scanner contains subsystems for communicating to a host computer, the hardware and firmware for processing and transmitting the images, motion controllers, etc. The sheet-fed scanner contains all the subsystems that are shared by both elements as well as those unique to the sheet-fed functionality.

The platen scanner contains a single camera, usually comprised of a CCD or CMOS array and supporting electronics, and a motor for moving the camera. A motor control system is not necessarily included. The platen scanner is totally dependent on the sheet-fed scanner and so passes scanned information to the sheet-fed element, which processes the information for transmittal to the host computer.

The tether effects the connection necessary to provide power to the camera and lamps within the platen scanner, for the sheet-fed scanner to drive the mechanism performing the scanning operation within the platen scanner; and for passing the scanned image from the platen scanner to the sheet-fed scanner for image processing, prior to passing the information to the host, in the same manner as those originating within the sheet-fed element.

This arrangement allows for the image processing within the sheet-fed unit to create the images so that they appear the same regardless of which unit the original document was scanned on. This is because the parameters for processing images from each of the two units can be included in the image processing within the sheet-fed scanner. Having the image processing built into the scanner, as opposed to having the host computer do the image processing, allows for use of dedicated electronic hardware for this function, providing faster processing speeds. The image processing could include, but is not limited to, image enhancements, conversion to a grayscale or a black-and-white image, image skew correction, border removal, background form dropout, and image file compression.

This tethered arrangement also allows for attachment of more than one platen scanner onto a single sheet-fed scanner for greater productivity. The means of tethering the platen scanner to the sheet-fed scanner could include, but not be limited to, a wire cable containing a number of individual conductors, an optical fiber cable, radio-frequency transmission link, or an infrared transmission link. If the communications link is a wire cable, then the power to operate the platen scanner can be from the sheet-fed scanner. If the communications link is by optical fiber cable, radio-frequency or infrared transmission/reception then the platen scanner power source must be independent.

Figure 10:
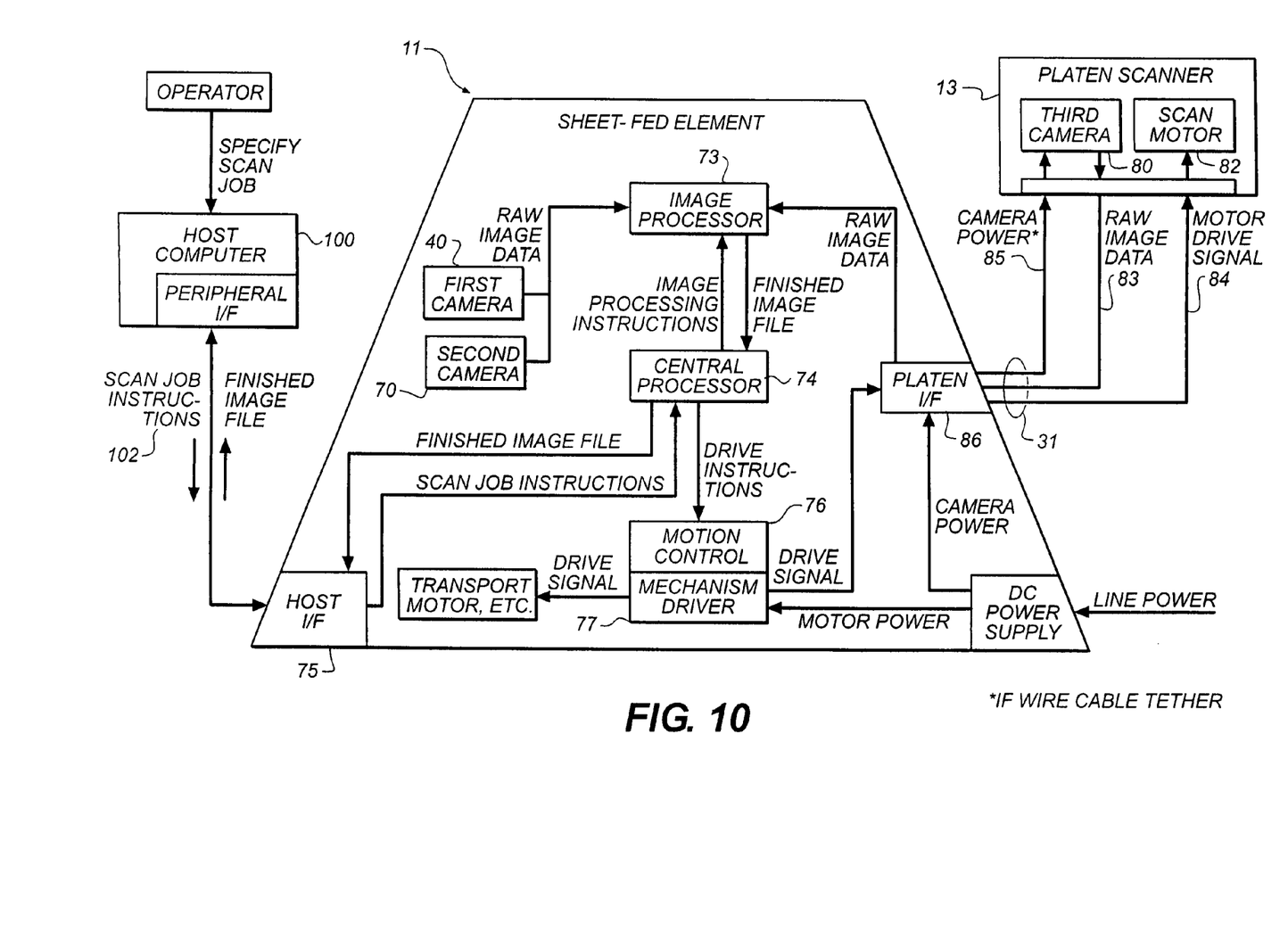
FIG. 10 is a flow diagram of the platen scanning process using a tether according to a preferred embodiment.

FIG. 10 is a flow diagram of the platen scanning process using a tether. Platen scanner 13, in simplified form, includes a third camera 80 and a scan motor 82. The sheet-fed scanner provides, through a tether 31, camera power 85 and motor drive signal 84. Raw image data 83 is provided to the sheet-fed scanner 11 through platen interface 86. Raw image data 83 is sent to image processor 73 and a finished image file is sent to a central processor 74. The finished image is sent to a host interface 75 and to a host computer 100.

The host computer also sends scan job instructions 102 to the sheet-fed scanner 11 through host interface 75. The scan job instructions are processed by the central processor and image processing instructions are sent to the image processor 73. The central processor also sends drive instructions to the motion control 76 and mechanism driver 77. The drive signal is sent through platen interface 86 to the platen scanner motor 82.

Figure 11:
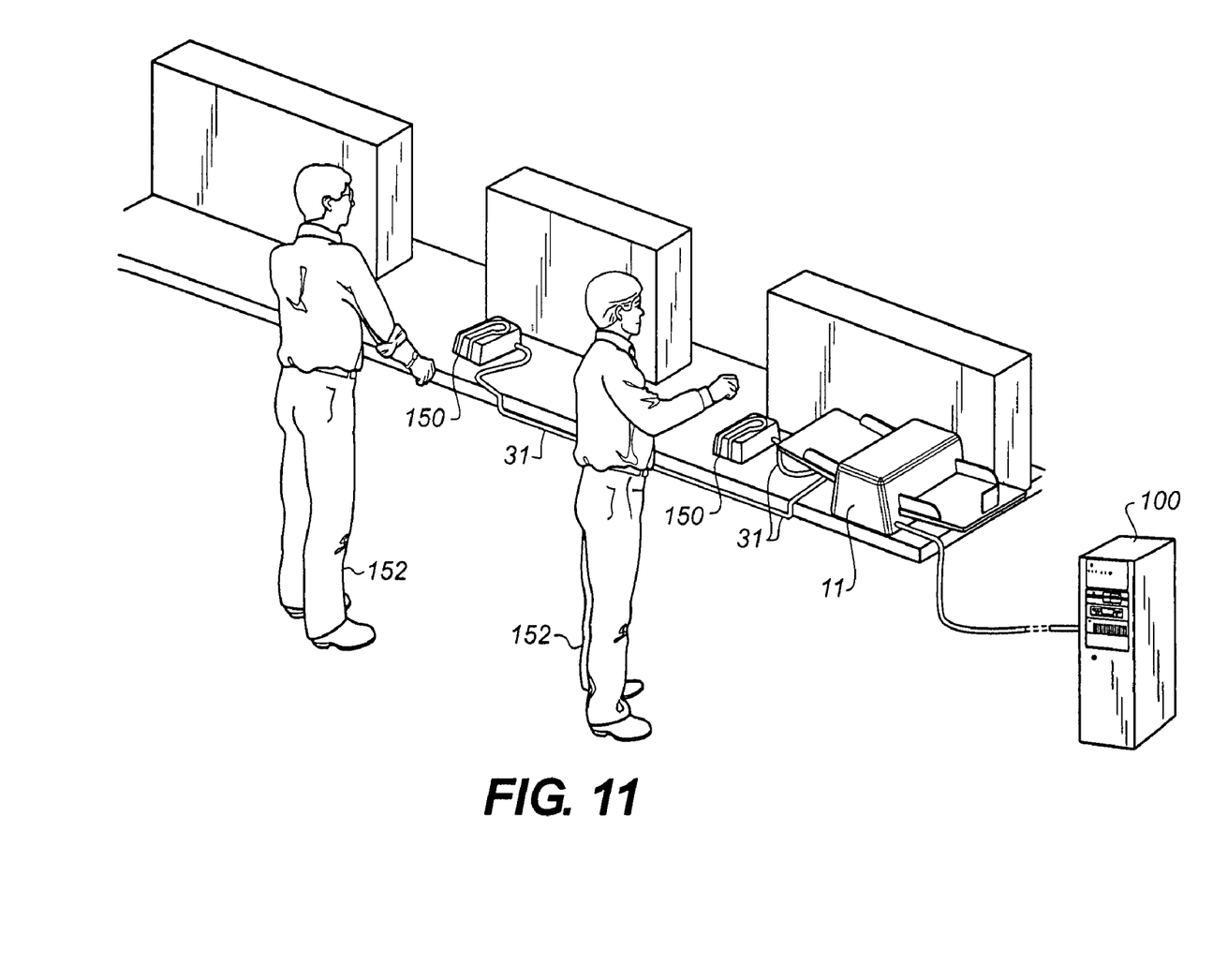
FIG. 11 is an illustration of an embodiment of the present invention showing multiple tethered units for check or ticket scanning connected to a central scanner.
Figure 13:
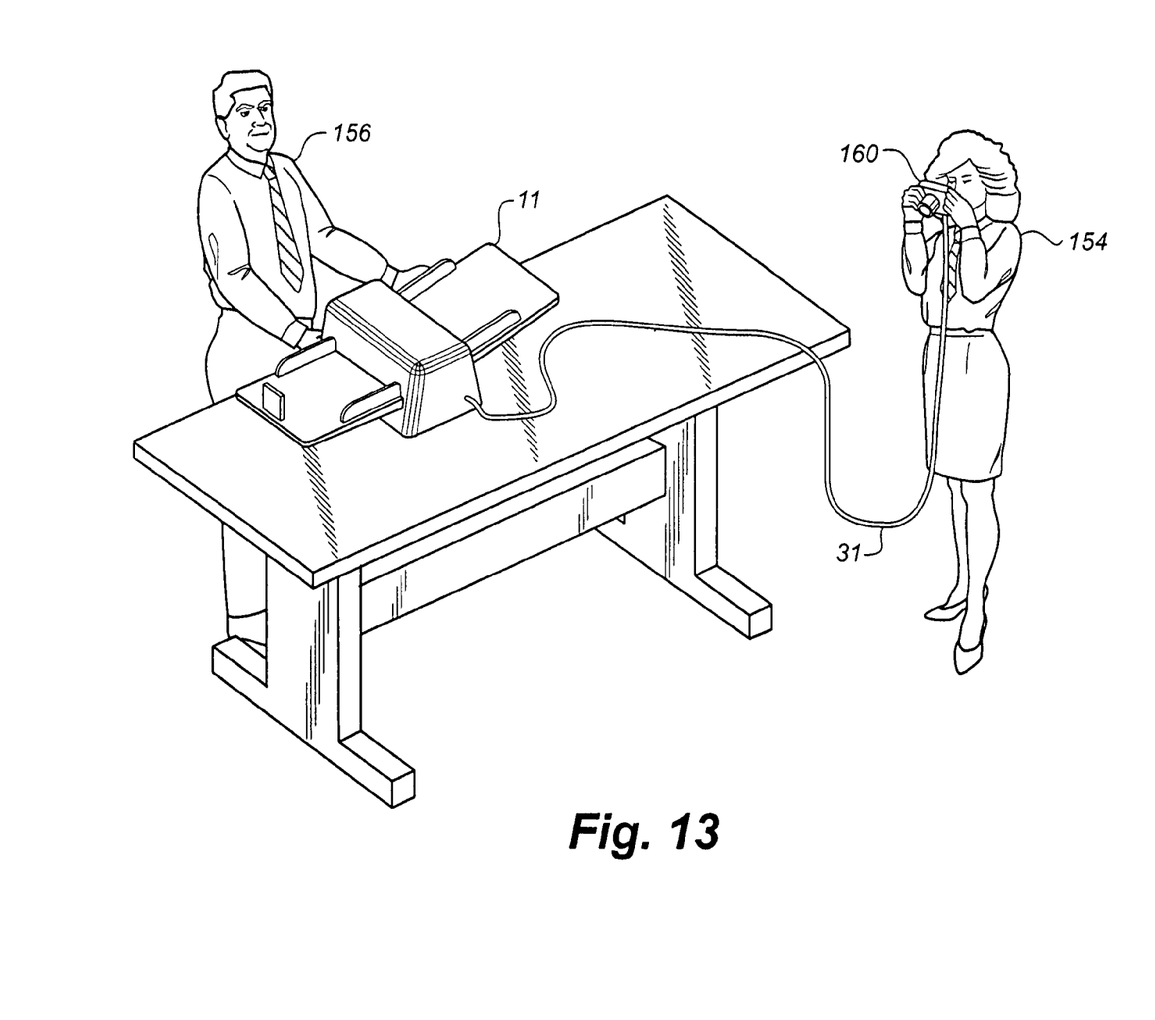
FIG. 13 is a perspective view of an alternate embodiment of the invention shown in FIG. 12.

FIG. 11 shows an additional embodiment of the invention. In FIG. 13, ticket takers 152, for example at an airport, scan tickets into a specialized scanner 150 which are tethered to a base unit, such as sheet-fed scanner 11, by wire cable tether 31. Thus, a plurality of specialized scanners 150 could enable ticket takers 152 to validate hard copy tickets either at the gate or at the counter in airports. Thus, the cost of individual scanners at each counter is reduced since the number of components in each of the specialized scanners 150 are reduced. The passengers drivers license in addition to being visually checked by the ticket takers 152, could also be scanned and a record retained of the drivers license or other identification and the ticket could be maintained permanently. The record could also be forwarded to law enforcement agencies by the host computer 100 for checks by the FBI, Immigration and Naturalization service, and other appropriate agencies.

Figure 12:
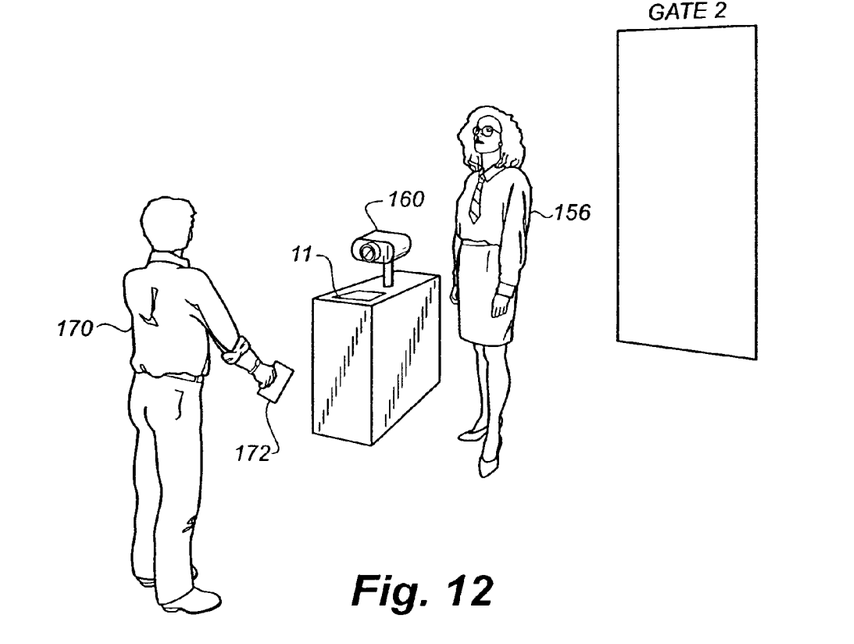
FIG. 12 is a perspective view of an embodiment of the present invention showing a digital camera and scanner at an airport gate.
Figure 14:
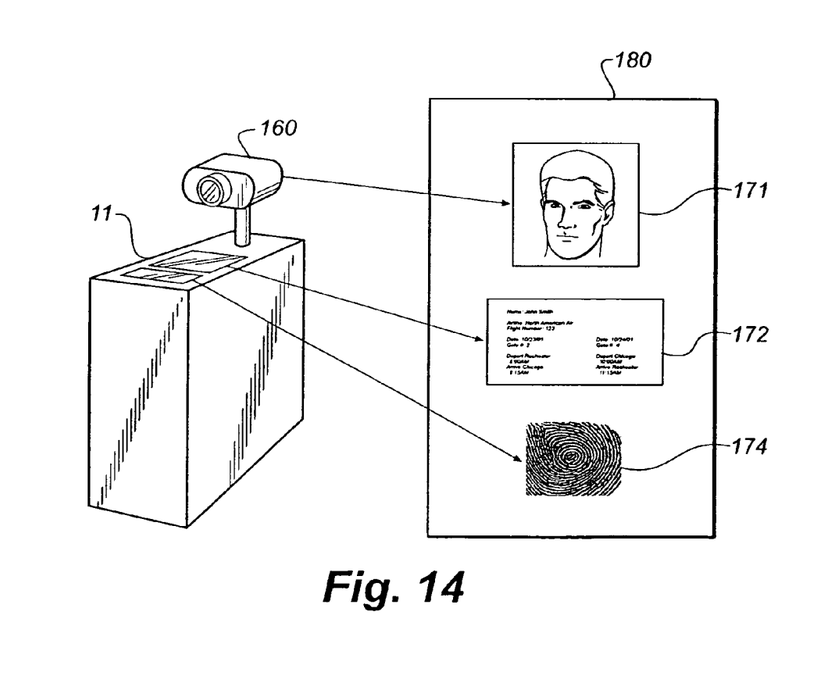
FIG. 14 is a schematic view showing the type of record produced by the invention shown in FIG. 12.

FIGS. 12-14 show another embodiment of the invention which may be useful at airport boarding gates. An attendant 156 takes a digital photograph of passenger 170 using digital camera 160 of a passenger boarding a plane. The digital camera 160 transmits an image to a scanning unit 11. The passengers ticket 172 is also scanned by scanning unit 11. The digital image of the passenger, the ticket, and other information would then be transmitted to a host computer for the purposes of establishing a permanent record of who actually boarded the flight and verification by law enforcement agencies.

FIG. 13 shows another embodiment of the invention described, with respect to FIG. 12. In this embodiment an additional attendant 154 takes a digital photograph of the passenger with a digital camera 160 which is tethered to scanning unit 11 by wire cable tether 31. Attendant 156 may scan the passengers ticket, drivers license, or additional information for preparation of a permanent composite record. The record would be stored or checked by law enforcement agencies or both. Additional remote units at other gates may also be attached to scanning unit 11 by tethers, thus once again reducing component cost.

FIG. 14 shows how a composite record 180 is prepared which includes both a photograph 171 of the passenger 170 boarding, an image of the passengers ticket 172, and a fingerprint 174 of the passenger. This information may be transmitted to a centralized location to cross-check the passengers image and boarding pass information against FBI lists, criminal records, and immigration lists. If nothing else, the record provides information on who actually boarded the plane.

The system as described provides a method and apparatus for reducing the component cost of owning both platen scanners and sheet-fed scanners. In some embodiments multiple platen scanners may be used for specialized functions lowering total ownership cost by reducing the functionality required of each of the individual tethered platen scanners. In yet another embodiment of the invention composite records of passengers boarding aircraft can be obtained for long-term storage to provide permanent records of individuals boarding aircraft and cross-checking and verification by law enforcement agencies.

While the invention has been described with reference to specific and preferred embodiments, it should be understood that aspects of the invention may have application in other context and that variations and modifications to the present invention may become apparent to those of ordinary skill in the art. It is, therefore, contemplated that such variations and modifications be encompassed within the scope of the invention and the following claims.

PARTS LIST

10. Scanning system
11. Sheet-fed scanner (first scanning unit)
12. First enclosure
13. Platen scanner (second scanning unit)
14. Second enclosure
15. Upper half enclosure
16. Lower half enclosure
18. Feeder opening
20. Exit opening
21. Inkjet printer
26. Glass top
27. Top surface
28. Lid
29. Exit paper tray
30. Hinge
31. wire cable tether
33. Optical fiber cable tether
34. Radio frequency transmission signal
35. Infrared transmission signal
40. First image-forming subsystem (camera)
42. Lens
44. Imaging sensor
50a. First light source
50b. Second light source
58a. First top roller
58b. First bottom roller
58c. Second top roller
58d. Second bottom roller
58g. Roller
58h. Roller
59. Double document sensor
60. Feeder roller
62. Separation roller
66. Paper pathway
69a. First mirror
69b. Second mirror
69c. Third mirror
69d. Fourth mirror
70. Second image-forming subsystem (camera)
72. Lens
73. Image processor
74. Central processor
75. Host interface
76. Motion control
77. Mechanism driver
80. Third image-forming subsystem (camera)
81. Rod
82. Motor
83. Raw image data
84. Motor drive signal
85. Camera power
86. Platen interface
92a. Pulley
92b. pulley
93. Motor
94. Belt
100. Host computer
102. Scan job instructions
150. Specialized scanner
152. Ticket takers
154. Attendant
156. Gate attendant
160. Digital camera
170. Passenger
171. Passenger photograph
172. Passenger ticket
174. Passenger fingerprint
180. Composite record
210. Sheet-fed scanner
220. Platen scanner
230. Combination sheet-fed and platen scanner

What is claimed is:

1. A scanning system supporting platen and sheet-fed scanning of documents comprising:
    a first scanning unit with a first enclosure housing a first set of mechanisms for sheet-fed, double-sided scanning functions, said first scanning unit further comprising a connection to a computer; and
    a second scanning unit with a second enclosure, attached to said first scanning unit through a first tether interface, and including a second set of mechanisms for single-sided platen scanning of documents wherein:
    said first tether interface provides for power from said first scanning unit to said second scanning unit;
    said first tether interface transmits digital information between said first and second scanning units;
    said first and second scanning units are physically separated; and
    wherein a unit control and image processing electronics contained in said first scanning unit handles data control and camera movement for both said first scanning unit and said second scanning unit.

2. The scanning system of claim 1 wherein a third digital scanning device is attached to said first scanning unit or said second scanning unit through a second tether interface.

3. The scanning system of claim 2 wherein said digital scanning device is for scanning checks or tickets.

4. The scanning system of claim 1 wherein said first scanning unit and said second scanning unit share a common host address on said computer.

5. The scanning system of claim 1 wherein a third scanning unit with a third enclosure is attached to said first scanning unit through said tether interface.

6. The scanning system of claim 1 wherein said tether interface is an electronic cable.

7. The scanning system of claim 1 wherein said first set of mechanisms of said first scanning unit comprise:
    a feeder opening through which paper documents are fed into said first scanning unit;
    an exit opening adapted to output scanned documents from said first scanning unit;
    a paper pathway extending from said feeder opening to said exit opening; and
    a first image-forming subsystem disposed within said first scanning unit for scanning images appearing on documents fed through said feeder opening.

8. The scanning system of claim 7 wherein said first image-forming subsystem comprises a camera.

9. The scanning system of claim 7 further comprising a feed roller disposed about said feeder opening and adapted to facilitate the introduction of said documents into said first paper pathway.

10. The scanning system of claim 9 further comprising a separation roller disposed adjacent to said feed roller and adapted to ensure that only a single sheet of paper is fed through said feeder opening at any one time.

11. The scanning system of claim 7 further comprising a plurality of rollers disposed about said paper pathway and configured for facilitating the transmission of paper documents from said feeder opening to said exit opening.

12. The scanning system of claim 7 wherein said first image-forming sub-system comprises:
a lens;
a light source disposed about said first paper pathway for directing light into paper documents entering said first scanning unit through said feeder opening;
reflection means disposed for guiding reflected light from said paper documents to said lens; and
a camera for capturing an image of said reflective light.

13. The scanning system of claim 12 wherein said reflection means comprises mirrors.

14. The scanning system of claim 1 wherein said second enclosure of said second scanning unit further comprises a substantially flat upper surface.

15. The scanning system of claim 14 wherein said second enclosure further comprising a glass top fixed to said upper surface and providing a platform upon which documents can be placed.

16. The scanning system of claim 15 further comprising:
a lid for covering documents placed on said glass top; and
a hinging means coupling one end of said lid.

* * * * *